July 9, 1946.  A. D. CLARK  2,403,638
THRASHING MACHINE
Filed Nov. 26, 1943
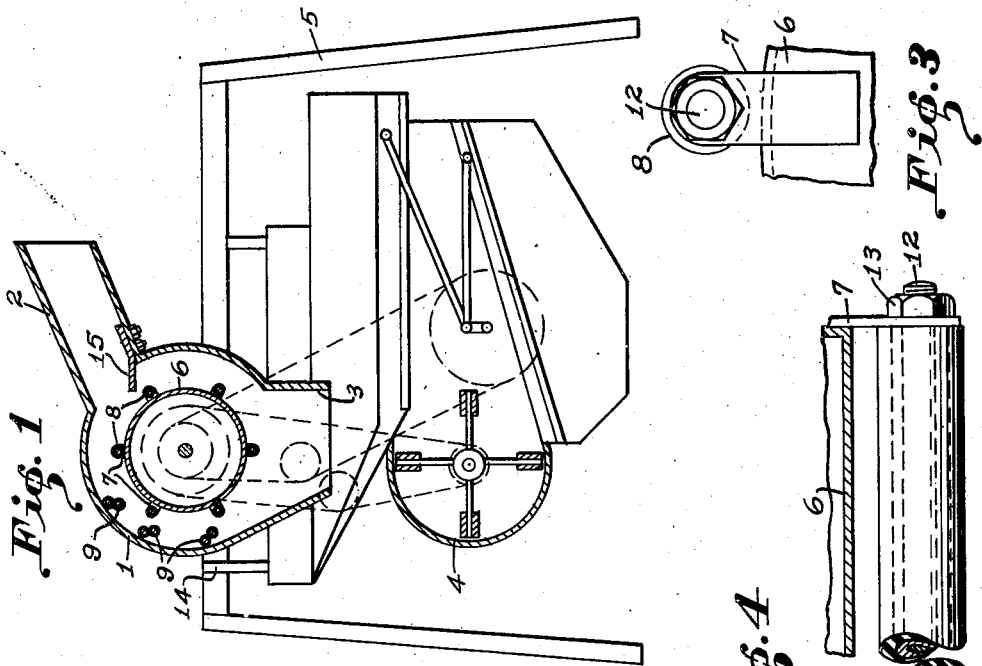
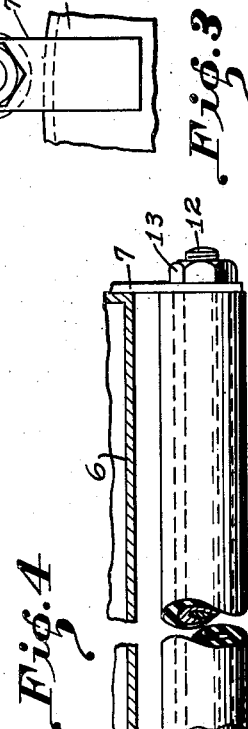
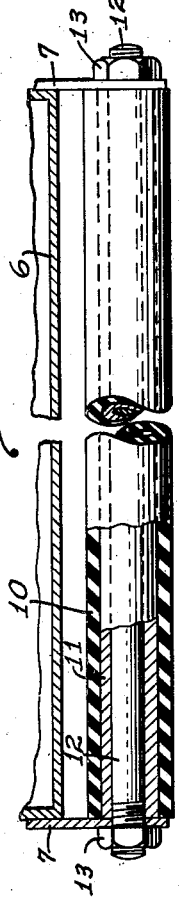
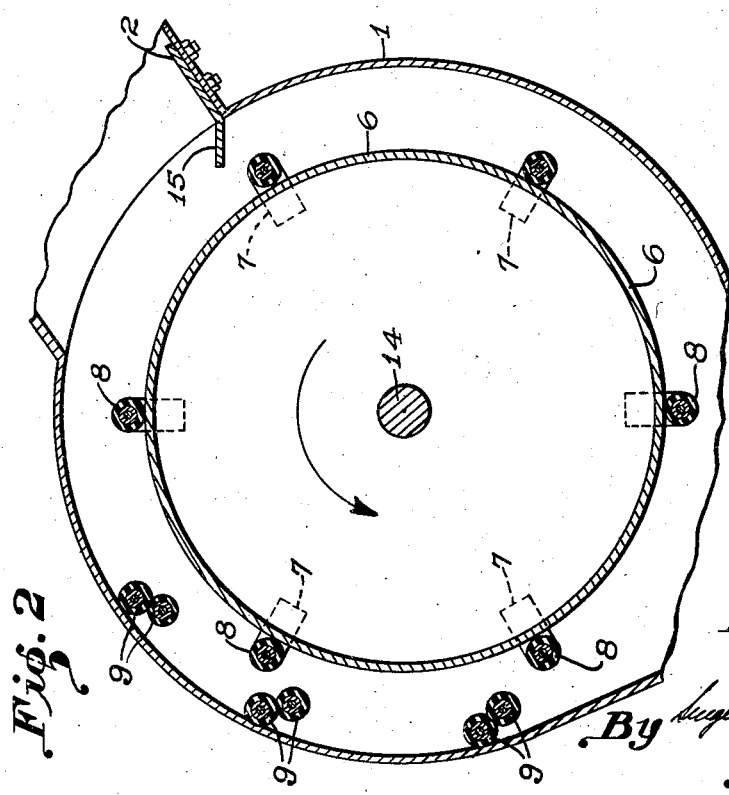
Inventor:
A. D. Clark
Attorneys Patented July 9, 1946

2,403,638

UNITED STATES PATENT OFFICE 2,403,638

THRASHING MACHINE

Andrew Douglas Clark, Pietermaritzburg, Natal, Union of South Africa

Application November 26, 1943, Serial No. 511,839
In the Union of South Africa May 14, 1943

3 Claims. (Cl. 130—27)

This invention relates to improvements in thrashing machines and has reference to a machine particularly adapted for the purpose of thrashing beans, peas and like crops although it is by no means limited to this specific use and may accordingly be used for thrashing many other farm crops.

An object of the invention is to provide a machine which will reduce to a minimum the percentage of seeds or kernels which are broken in the course of the thrashing operation.

The invention is an improvement in the well known general type of thrashing machine in which the actual thrashing operation is effected by a rapidly rotating drum which coacts with a fixed "concave" of arcuate, grid or cage formation positioned in outwardly spaced relationship with the path of a plurality of spaced beater elements attached to the drum; in which the crop to be thrashed is fed into the space between the path of said beater elements and the "concave" through a suitably positioned feed opening towards the top of the drum casing, and in which the thrashed grain and husks are discharged through an opening in the bottom of the casing onto suitable sieving and winnowing means.

According to the invention a thrashing machine for the purpose and of the kind set forth, is characterised in that the actual thrashing operation is effected by means of a rotating drum member which is provided with a plurality of circumferentially spaced beater bars arranged parallel with the axis thereof, which beater bars have at least their contact surfaces covered with or made of rubber or equivalent resilient material, and are arranged to rotate in inwardly spaced relationship with a plurality of spaced similarly covered or constructed co-acting fixed "concave" bars, arranged towards the upper side of an enclosing casing having an outlet opening in the bottom side thereof for the discharge of the thrashed grain and husks onto suitably positioned sieving and winnowing means.

More particularly the beater and "concave" bars all consist of cylindrical members each covered with a rubber sleeve or layer. The beater bars are arranged in equally spaced relationship around the drum, and are secured in outward radially spaced relationship with the periphery thereof by means of radially projecting brackets or lugs, preferably fixed to the ends of the drum or formed integrally therewith.

The said fixed "concave" bar assembly composed of a plurality of spaced rubber-sleeve-covered bar members and arranged in arcuate formation, extends from a point near the top of the drum casing to a point substantially in line horizontally with the axis thereof, or a short distance below said axis and is arranged on the side of the casing substantially opposite to a feed opening therein by means of which the crop to be thrashed is fed to the machine.

It is to be understood that the beater drum is rotated in a direction so that the motion of its top side is from said feed opening towards the fixed "concave" bar assembly.

In a preferred construction the fixed bar members forming the "concave" assembly, are arranged in pairs with the spaces between each pair substantially greater than the spaces between the bars forming each pair.

Both the fixed and rotating rubber-covered bars are readily replaceable such as by being in the form of metal rods or pipe lengths, having a screw thread on at least one end thereof with which a nut or nuts co-operate for fixing said ends in holed brackets, lugs or the like projecting from the beater drum.

To enable the invention to be more clearly understood and carried into practice, reference is now made to the accompanying drawing, in which like references denote like parts throughout the several views.

In the drawing:

Fig. 1 is a part-sectional vertical elevation of a thrashing machine constructed according to the invention.

Fig. 2 is a fragmentary vertical sectional view of the rotating drum member and casing, of Fig. 1, but drawn to a larger scale.

Fig. 3 is a fragmentary end view of one of the beater bars and its supporting lug, and Fig. 4 is a part-sectional shortened view of the beater bar and lugs of Fig. 3.

Referring to the drawing reference 1 denotes a casing having a feed chute 2 and a bottom discharge opening 3 through which the thrashed grain and husks fall onto the usual sieving and winnowing means denoted generally by the reference 4, the whole assembly being supported in a frame 5.

Mounted on a shaft 14 for rotation within the casing 1, is the drum 6 to which are attached, by means of the lugs 7, the six spaced beater bars 8, which are arranged so that they rotate close to the three spaced pairs of fixed "concave" bars 9, which are disposed within the casing 1, as more clearly shown in Fig. 2, so that the lower bar of each pair is nearer the path of rotation of the beater bars 8 than the upper bar of each pair.

Both the beater bars 8 and the fixed "concave" bars 9, are each provided with a rubber sleeve 10 as more clearly shown in Fig. 4. Each of the said bars preferably consists of a length of metal piping 11, threaded over a rod 12, having nuts 13 on its screw-threaded ends by which the bars are fixed to the lugs 7 or, in the case of the fixed "concave" bars, to the end walls of the casing 1.

With a machine in which the diameter of the path of rotation of the beater bars 8 is about 18 inches, the speed of rotation for the drum is generally 550 to 600 R. P. M., while for thrashing beans, peas and like crops, the speed is preferably about 420 R. P. M.

An adjustable lip plate 15 projecting from the bottom side of the feed chute 2, guides the crop to be thrashed into the path of the rotating beater bars 8.

What I claim is:

1. In a machine of the character described, the combination of a rotary drum, brackets on the end walls of the drum, bars secured to the brackets in outwardly spaced relationship with the periphery of the drum, a casing surrounding the drum, and pairs of bars secured to the inner wall of the casing, with one bar of each pair at a greater distance from the wall of the casing than the other bar and being located for cooperation with the bars of the rotary drum.

2. In a machine of the character described, the combination of a rotary drum, brackets on the end walls of the drum, bars having a resilient outer covering secured to the brackets in outwardly spaced relationship with the periphery of the drum, a casing surrounding the drum, and pairs of bars each having a resilient outer covering secured to the inner wall of the casing with one bar of each pair spaced farther away from the wall of the casing than the other bar, both of the bars having a resilient outer covering for cooperation with the bars of the drum.

3. In a machine of the character described, the combination of a rotary drum, brackets secured to the end walls of the drum, bars mounted on the outer ends of the brackets, metal sleeves surrounding the bars and rubber tubing surrounding the metal sleeves between the brackets, a casing surrounding the drum, and pairs of bars each having a resilient outer covering secured to the inner wall of the casing with one bar of each pair closer to the wall of the drum than the other bar of each pair, both of the bars of each pair comprising a metal rod secured to the casing, a metal sleeve surrounding the rod and a tubular rubber cushion surrounding the sleeve.

ANDREW DOUGLAS CLARK.